(12) United States Patent
Feller

(10) Patent No.: US 7,671,791 B2
(45) Date of Patent: Mar. 2, 2010

(54) GPS RECEIVER FOR USE WITH DIFFERENTIAL-GPS SIGNALS

(75) Inventor: Walter J. Feller, Airdrie (CA)

(73) Assignee: NovAtel Inc., Calgary, Alberta (CA)

( * ) Notice: Subject to any disclaimer, the term of this patent is extended or adjusted under 35 U.S.C. 154(b) by 255 days.

(21) Appl. No.: 11/748,203

(22) Filed: May 14, 2007

(65) Prior Publication Data

US 2007/0262899 A1 Nov. 15, 2007

Related U.S. Application Data

(60) Provisional application No. 60/799,994, filed on May 12, 2006.

(51) Int. Cl.
*G01S 5/14* (2006.01)
(52) U.S. Cl. .................................. 342/357.03
(58) Field of Classification Search ...............
342/357.01–357.17, 352–353
See application file for complete search history.

(56) References Cited

U.S. PATENT DOCUMENTS

| 5,523,761 | A | | 6/1996 | Gildea |
| 5,654,717 | A | * | 8/1997 | Nichols et al. .......... 342/357.06 |
| 5,831,577 | A | | 11/1998 | Nichols et al. |
| 6,236,359 | B1 | * | 5/2001 | Watters et al. ........... 342/357.1 |

* cited by examiner

*Primary Examiner*—Thomas H Tarcza
*Assistant Examiner*—Nga X Nguyen
(74) *Attorney, Agent, or Firm*—Cesari and McKenna, LLP; Patricia A. Sheehan

(57) ABSTRACT

The present disclosure provides a system for converting differential-GPS signals to a format suitable for input to a conventional GPS receiver and combining the converted signal with GPS ranging signals. The combined signals are provided to a conventional GPS receiver via a cable. Circuitry for converting the augmentation signal and combining it with a GPS signal are co-located in a housing which supports both a standard GPS antenna and a differential GPS augmenting signal antenna.

22 Claims, 2 Drawing Sheets

GPS RECEIVER FOR USE WITH DIFFERENTIAL-GPS SIGNALS

CROSS REFERENCE TO RELATED APPLICATIONS

This application claims priority from U.S. Provisional Application No. 60/799,994 entitled GPS RECEIVER FOR USE WITH DIFFERENTIAL-GPS SIGNALS which was filed on May 12, 2006.

FIELD OF THE INVENTION

The invention relates to global positioning system (GPS) receivers and more particularly to GPS receivers which provide position measurements that are augmented by auxiliary data broadcasts.

BACKGROUND OF THE INVENTION

Augmented GPS receivers calculate position measurements by utilizing ranging signals that are received from orbiting ranging satellites and refined by means of auxiliary data broadcast from (1) fixed, earth-based receivers that receive ranging signals from all or some of the same satellites and (2) geostationary satellites that provide data about the ranging satellites. The use of a Differential-GPS (DGPS) system to improve the position calculations of a GPS receiver is well known and need not be described here, except to note that it requires two receivers. In a common DGPS implementation, one receiver is needed to receive ranging signals transmitted by earth-orbiting satellites, and another receiver is needed to receive auxiliary signals that are transmitted by a fixed terrestrial station. The fixed station typically transmits corrections for the position calculations derived from the conventional GPS ranging signals.

In another common DGPS implementation, the auxiliary signals are broadcast from geostationary satellites, and thus a receiver is needed to receive these signals. The geostationary satellites illustratively transmit data about the ranging GPS satellites that can be used to enhance position determinations.

These common DGPS implementations require the use of separate antennas and dedicated demodulators to receive and demodulate the GPS ranging signals and the auxiliary signals, respectively, because of the differences in frequencies and signal formats between the ranging signals and the auxiliary signals.

A typical DGPS implementation consists of the two receivers located in a common housing. Accordingly, when an upgrade is required to the auxiliary receiver to, for example, utilize a different frequency of auxiliary signals; both receivers must often be replaced. The same often holds true when the functionality of an auxiliary receiver is to be added to a device that houses a GPS receiver. When, for example, the GPS receiver is mounted in a handheld device, such an upgrade may require replacing the entire device or at least the ranging receiver to provide sufficient space in the housing to mount both receivers. An additional problem associated with an upgrading that adds or expands the operations of an auxiliary receiver is that the operations of the auxiliary receiver may interfere with the operations of the ranging receiver or the operations of other transmitters or receivers included in the handheld device, such as, for example, blue tooth transmitters and receivers. This is particularly true within the tight constraints of a hand held device.

Antennas that are typically used to receive the auxiliary signal in a DGPS system are electric field (E-field) antennas and magnetic field (H-field) antennas. H-field antennas are generally preferred for systems that are used near significant electrostatic noise sources such as near power lines and where a good ground reference may not be available for an E-field antenna. However, H-field antennas are particularly susceptible to many sources of interference. Co-location of the auxiliary signal receiver of a DGPS system in the same housing with the GPS ranging signal receiver allows the noise from the ranging signal GPS receiver to interfere with auxiliary signal such as those received from an H-field antenna.

Certain previously known DGPS implementations have attempted to solve the interference problem by separating an antenna unit which supports the differential antenna and the GPS ranging antenna from the radio frequency (RF) front end circuitry of the respective receivers. Circuitry is included in the antenna unit which amplifies the GPS signal received from the antenna and superimposes it upon a signal from the differential antenna. The combination signal is sent from the antenna unit via a cable to a receiver system that includes the RF front end circuitry for the GPS ranging signal as well as the RF front end circuitry for the differential signal. The receiver system is thus complex and suffers from many of the same problems discussed above with respect to upgrading or adding functionality, such as use of additional augmentation signals, to the receiver system.

SUMMARY OF THE INVENTION

The inventive receiver system converts differential-GPS (DGPS) augmentation signals to a frequency that is suitable for input to an RF front end of a standard GPS receiver and combines the converted signal with GPS ranging signals. Circuitry for converting the augmentation signal and combining it with a GPS signal are located in an antenna housing which supports both a standard GPS antenna and a differential GPS augmenting signal antenna. The combined signals are provided to the GPS receiver via a cable.

The augmentation signal is converted to a format suitable for input to a standard GPS receiver by upconverting the signal to a GPS carrier frequency. Illustratively, the augmentation signal may be upconverted to a frequency that is slightly offset from the frequency of the GPS ranging signal in order to avoid interference between these two signals. Alternatively, the augmentation signal may be converted to match both the GPS frequency and signal format by modulating the signal with a suitable PRN code. In either embodiment, each component of the combined signal is suitable for input to a standard RF front end of GPS receiver.

The present invention prevents crowding of differential GPS components in the limited space of a conventional GPS receiver by enclosing the differential GPS components in a separate housing such as a remote antenna housing. The inventive differential GPS system can be upgraded by replacing the differential GPS components and upgrading software in the GPS receiver without requiring replacement of the GPS receiver. Furthermore, by separating the differential GPS antenna and differential GPS receiver components from the conventional GPS receiver, the present invention prevents noise from the conventional GPS receiver from interfering with reception of the differential GPS augmentation signal.

The inventive DGPS system includes a differential signal converter configured to receive a differential GPS signal from a differential GPS antenna and convert the differential GPS signal into a GPS receiver compatible signal. A GPS filter is configured to receive a GPS ranging signal from a GPS antenna and filter the ranging signal to provide a GPS ranging signal. The GPS receiver compatible signal has the same carrier frequency, and in one embodiment the same format, as the GPS ranging signal.

The differential signal converter includes a differential signal receiver connected to the differential GPS antenna and receives the differential GPS signal from the differential GPS antenna. The converter also includes a signal generator which, in one embodiment, generates an enhancement signal having the same frequency and format as the GPS signals received by the GPS antenna and in a second embodiment generates a upconverting signal that when combined with the received differential signal upconverts the signal carrier to a GPS carrier frequency. A GPS modulator connected to the differential signal receiver and to the signal generator modulates the enhancement signal with the differential GPS signal to generate the GPS receiver compatible signal.

A signal combiner is connected to the differential signal converter and to the GPS filter. The signal combiner receives the GPS receiver compatible signal from the differential signal converter and receives the GPS ranging signal from the GPS filter. The signal combiner is adapted to combine the GPS receiver compatible signal with the GPS ranging signal to generate a combined GPS input signal suitable for input to a conventional GPS receiver RF front end.

A housing supports the differential GPS antenna and the GPS antenna. The housing also encloses the differential signal converter, the GPS filter and the signal combiner. A cable is connected to the signal combiner for receiving the combined GPS input signal from the signal combiner and delivering the combined GPS input signal to a GPS receiver. The cable also provides power from the GPS receiver to the differential signal converter, the GPS filter and the signal combiner.

Accordingly, the GPS receiver can demodulate the differential-data signal in the same manner and with the same circuitry as is used for demodulation of the signals from the satellites. The only modification of the receiver is in the software, which (1) avoids direct use of the data in the differential-data signals in directly calculating position estimates and, instead, (2) uses the recovered differential-GPS data in the same manner as in prior differential-GPS arrangements. It will be apparent that deployment of the inventive antenna unit requires only that the user connect the cable from the unit to the GPS antenna terminal of the receiver. In the simplest embodiment of the invention, modification of the receiver requires only software changes.

BRIEF DESCRIPTION OF THE DRAWINGS

The invention description below refers to the accompanying drawings, of which.

DETAILED DESCRIPTION OF AN ILLUSTRATIVE EMBODIMENT

A DGPS receiver incorporating the invention makes use of an antenna housing supporting antennas for both reception of GPS signals and signals from one or more stations providing differential-GPS information. The data recovered from the latter signals modulates the output of a signal generator that provides a signal of the same frequency, and in one embodiment the same format, as the ranging signals transmitted by the orbiting GPS satellites. These signals are combined with the GPS signals and coupled to a GPS receiver over a single cable.

Figure 1:
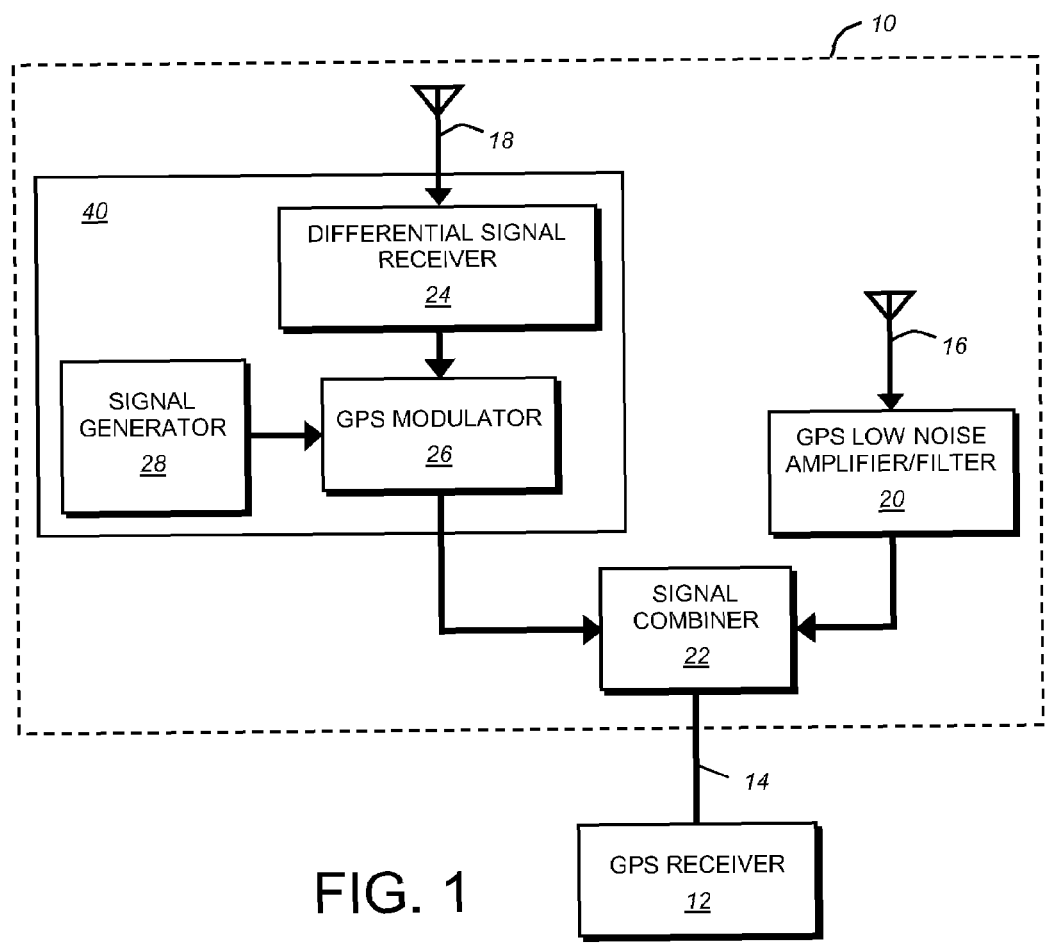
FIG. 1 is a schematic diagram of a differential-GPS incorporating the invention.

As shown in FIG. 1, a differential-GPS receiver arrangement incorporating an illustrative embodiment comprises an antenna unit 10 connected to a GPS receiver 12 by a cable 14. The unit 10 includes a GPS antenna 16 and a differential antenna 18, which receive signals that are ultimately conveyed to the receiver 12 over the cable 14. More specifically, the GPS ranging signals from orbiting satellites are amplified by a low-noise amplifier 20 and passed to a signal combiner 22 whose output is fed to the cable 14. In a differential signal converter 40, the differential signals from the antenna 18 are applied to a differential receiver 24 that detects and demodulates these signals to recover the differential-GPS data carried in them. The converter 40 also includes a modulator 26 which modulates the output of a signal generator 28 with the differential data from the receiver 24. The signal generator 28 provides an output having the same format and carrier frequency as the GPS signals transmitted by the orbiting satellites, but using a pseudorandom code different from those used by the satellites. The generator output is modulated by using the same bi-phase-modulation format that is used for data contained in the ranging signals from the orbiting satellites. The resulting signal is combined with the satellite-derived signals in the signal combiner 22.

In an alternative embodiment, the differential signal converter 40 upconverts the differential signals received from the antenna 18 without demodulating the received differential signal. The upconverted signals have a frequency that is suitable for input to the RF front end of the GPS receiver. Illustratively, the upconverted differential signal frequency may be offset from the carrier frequency of the GPS ranging signals by some small increment, for example, 1.023 MHz or some other GPS frequency null to prevent noise on the differential signal which is also upconverted from adversely affecting the processing of the GPS ranging signals. Other techniques may be employed instead of or in addition to the frequency offset to minimize the adverse affects of the upconverted noise.

Power for the various electrical components in the antenna unit 10 is sent up the cable 14 from the receiver 12. Preferably, with a hardware modification of the receiver the latter may transmit through the cable 14 a signal that is used to synchronize the signal generator 28 and modulator 26 to the receiver's clock and thereby speed up "acquisition" of the DGPS signal. The synchronizing signal is at a much lower carrier frequency than the incoming GPS signals and can therefore be easily separated from the latter signals by a simple filter (not shown) at each and of the cable 14.

Figure 2:
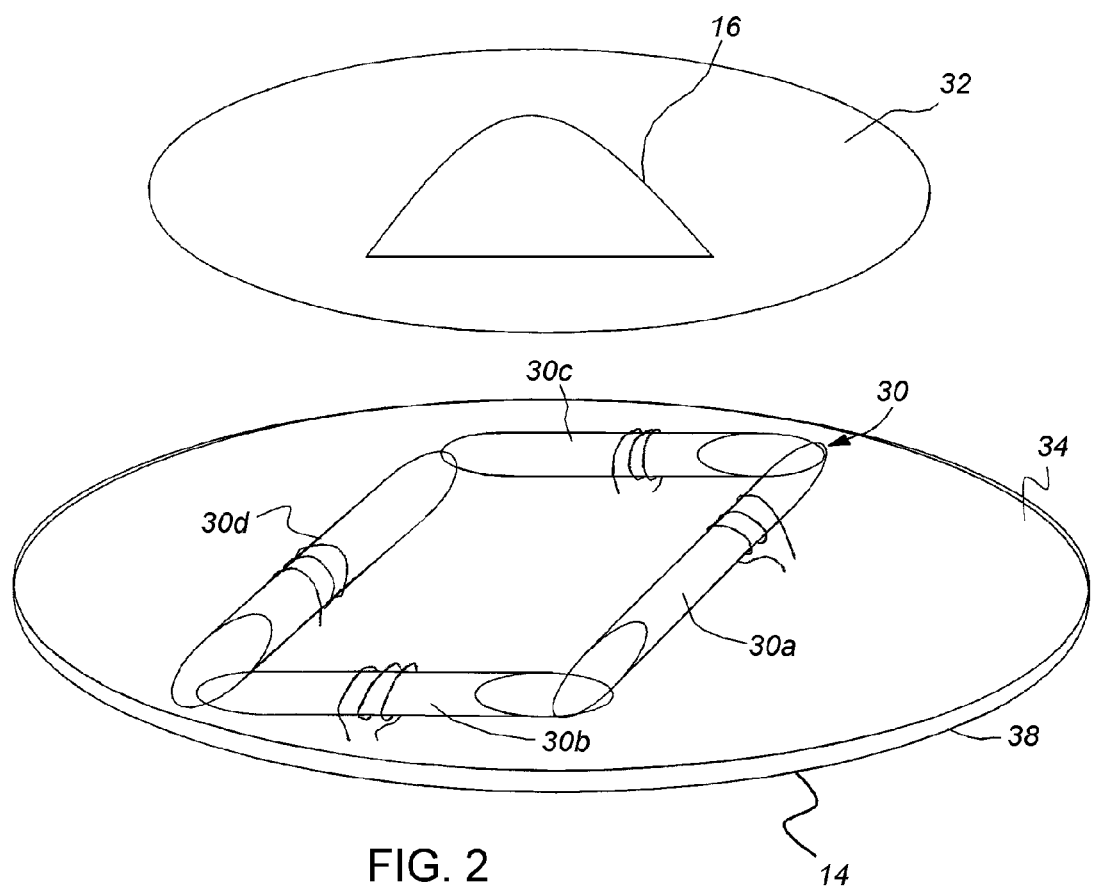
FIG. 2 is a simplified mechanical view of the antenna unit of FIG. 1.

FIG. 2 depicts an antenna unit used with low-frequency differential-GPS signals. An H-field antenna 30 is constructed from a ring of magnetic cores 30a-30d, sandwiched between a pair of pseudo-ground planes 32 and 34, which serve to shield the antenna 30 from electro-static interference. The GPS antenna 16 is secured to the upper ground plane 32. The lower ground plane 34 is on the upper surface of a circuit board 38 that supports, underneath, the components 20-28 of FIG. 1.

In the receiver 12, the usual correlation and demodulation operations are applied to all the signals transmitted over the cable 14. However, the differential-GPS signals from the modulator 26 are not used directly for range determination; instead they are demodulated and the differential-GPS data are thus recovered. This arrangement can be provided by a minor modification of the software that controls receiver operations, including the use of the differential-GPS data to refine position calculations.

In a conventional GPS receiver having an external antenna located some distance from the receiver, the antenna unit often includes a low-noise amplifier to boost the levels of the GPS signals transmitted over the cable to the receiver. Power for the amplifier is transmitted up the cable from the receiver. In accordance with the invention, the power is also used for a DGPS receiver in the antenna unit.

Although the invention is described primarily in connection with terrestrial DGPS augmentation signals, the invention is also useful for the integration of GPS satellite data broadcast by the INMARSAT satellite in making position calculations. The arrangement will be the same as depicted in FIGS. 1 and 2, except that an antenna for the INMARSAT signals will be included in an antenna unit 10 in addition to, or instead of, the DGPS antenna. The antenna unit 10, as appropriate, also includes an upconverter and/or a demodulator for the INMARSAT signals, such that the signals are combined through the combiner and sent over the cable 14 to the GPS receiver as discussed above.

Further flexibility can be provided by changing the frequency of the reference signal sent up to the antenna unit 10 and thereby changing the channels of the differential signals and/or the signals from geostationary satellites. The same end can be accomplished by sending a command signal up the cable 14, modulated with instructions that are recognized by the units being commanded.

The term "GPS," as used herein, is not limited to the Global Positioning System. It also includes any other satellite ranging systems contemplated now or in the future, whose position determinations can be enhanced by use of the invention described herein.

What is claimed is:

1. An antenna structure for a GPS receiver providing refined position calculations, the structure comprising:
    A. a housing;
    B. a GPS antenna supported by the housing for receiving GPS signals;
    C. an auxiliary antenna supported by the housing for reception of auxiliary signals;
    D. a demodulator enclosed in the housing and connected to demodulate the auxiliary signals sensed by the auxiliary antenna;
    E. a signal generator enclosed in the housing for generating an enhancement signal having the same frequency and format as the GPS signals received by the GPS antenna;
    F. a modulator enclosed in the housing for modulating the enhancement signal with the output of the demodulator;
    G. a signal combiner that combines the modulated enhancement signal and the GPS signals to produce a combined signal; and
    H. a cable for passing the combined GPS signals and modulated enhancement signal to a GPS receiver for demodulation of said signals.

2. The structure defined in claim 1 in which said modulated enhancement signal has the same carrier frequency and format as those of the GPS signals applied to the cable.

3. The structure of claim 1 including a preamplifier connected to amplify the signals received by the GPS antenna before they are applied to the cable.

4. An arrangement for receiving and processing GPS signals and differential-GPS signals, the arrangement comprising:
    A. a GPS receiver that includes:
        means for processing GPS signals and differential-GPS signals, and
        an internal antenna terminal;
    B. an antenna structure comprising:
        a housing,
        a GPS antenna supported by the housing,
        a differential-GPS antenna supported by the housing for reception of GPS correction signals,
        a demodulator enclosed in said housing and connected to demodulate the correction signals sensed by the differential-GPS antenna,
        a signal generator enclosed in the housing for generating an enhancement signal having the same frequency and format as the GPS signals received by the GPS antenna,
        a modulator enclosed in the housing for modulating the enhancement signal with the output of the demodulator, and
        a signal combiner that combines the GPS signals and the modulated enhancement signal to produce a combined signal, and
        a cable for passing the combined signals to the internal antenna terminal of the receiver.

5. The system defined in claim 4 in which the enhancement signal has the same carrier frequency and modulation format as those of the GPS signals applied to the cable.

6. The system of claim 4 including a preamplifier disposed in said housing and connected to amplify the signals received by the GPS antenna before they are combined with the enhancement signal.

7. A differential global positioning system (GPS) apparatus comprising:
    a differential signal converter configured to receive a differential GPS signal from a differential GPS antenna and convert the differential GPS signal into a GPS receiver compatible signal;
    a GPS filter configured to receive a GPS signal from a GPS antenna and filter the GPS signal to provide a GPS ranging signal;
    a signal combiner connected to the differential signal converter and to the GPS filter, the signal combiner receiving the GPS receiver compatible signal from the differential signal converter and receiving the GPS ranging signal from the GPS filter, the signal combiner being adapted to combine the GPS receiver compatible signal with the GPS ranging signal to generate a combined GPS input signal, the combined GPS input signal being suitable for processing by a GPS receiver.

8. The apparatus of claim 7, further comprising:
    a housing supporting the differential GPS antenna and the GPS antenna, the housing enclosing the differential signal converter, the GPS filter and the signal combiner; and
    a cable having a first end and a second end, the first end being connected to the signal combiner and receiving the combined GPS input signal from the signal combiner.

9. The apparatus of claim 8 further comprising:
    a GPS receiver including a GPS signal input terminal connected to the second end of the cable.

10. The apparatus of claim 9 wherein the cable provides power from the GPS receiver to the differential signal converter, the GPS filter and the signal combiner.

11. The apparatus of claim 7, wherein the differential signal converter comprises:
    a differential signal receiver connected to the differential GPS antenna and receiving the differential GPS signal from the differential GPS antenna;

a signal generator generating an enhancement signal having the same format as the GPS signals received by the GPS antenna; and a GPS modulator connected to the differential signal receiver and to the signal generator, the GPS modulator modulating the enhancement signal with the differential GPS signal to generate the GPS receiver compatible signal.

12. The apparatus of claim 7, wherein the differential signal converter comprises:

upconverter circuitry adapted to convert the differential GPS signal to an upconverted differential signal having a frequency suitable for input to an RF front end of a GPS receiver.

13. The apparatus of claim 7 wherein the frequency of the GPS receiver compatible signal is offset from the frequency of the second input signal.

14. The apparatus of claim 7 in which the

GPS receiver compatible signal has the same carrier frequency and format as the GPS ranging signal.

15. A differential GPS signal converter comprising:

a differential signal receiver adapted to receive a differential GPS signal;

a signal generator generating an enhancement signal, the enhancement signal having a format consistent with conventional GPS signals; and a GPS modulator connected to the differential signal receiver and to the signal generator, the GPS modulator modulating the enhancement signal with the differential GPS signal to generate a GPS input signal.

16. A method for providing enhanced global positioning system (GPS) information, the method comprising:

receiving a differential GPS signal from a differential GPS antenna;

converting the differential GPS signal into a GPS receiver compatible signal;

receiving a GPS signal from a GPS antenna;

filtering the GPS signal to provide a GPS ranging signal;

combining the GPS receiver compatible signal with the GPS ranging signal to generate a combined GPS input signal, the combined GPS input signal being suitable for input to a GPS receiver.

17. The method of claim 16, further comprising:

supporting the differential GPS antenna and the GPS antenna with a housing; and enclosing within the housing:

A. a differential signal converter to receive the differential GPS signal from the differential GPS antenna and convert the differential GPS signal into the GPS receiver compatible signal;

B. a GPS filter to receive the GPS signal from the GPS antenna and filter the GPS signal to provide the GPS ranging signal; and C. a signal combiner to combine the GPS receiver compatible signal with the GPS ranging signal to generate the combined GPS input signal.

18. The method of claim 17 further comprising:

connecting the signal combiner to a GPS receiver using a cable having a first end and a second end, the first end being connected to the signal combiner and receiving the combined GPS input signal from the signal combiner.

19. The method of claim 18 comprising:

receiving the combined GPS input signal from the second end of the cable to the GPS receiver.

20. The method of claim 18 comprising;

providing power to the housing from the GPS receiver via the cable.

21. The method of claim 16, further comprising:

generating an enhancement signal having the same format as the GPS signals received by the GPS antenna; and modulating the enhancement signal with the differential GPS signal to generate the GPS receiver compatible signal.

22. The method of claim 16 in which the GPS receiver compatible signal has the same carrier frequency and format as the GPS ranging signal.

* * * * *